July 31, 1956     A. C. EICHIN ET AL     2,756,698
SCOOP FOR ICE CREAM AND THE LIKE
Filed Feb. 24, 1954
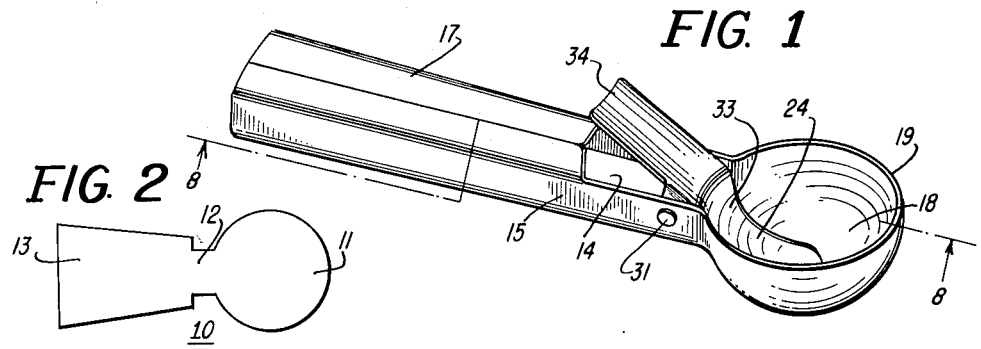
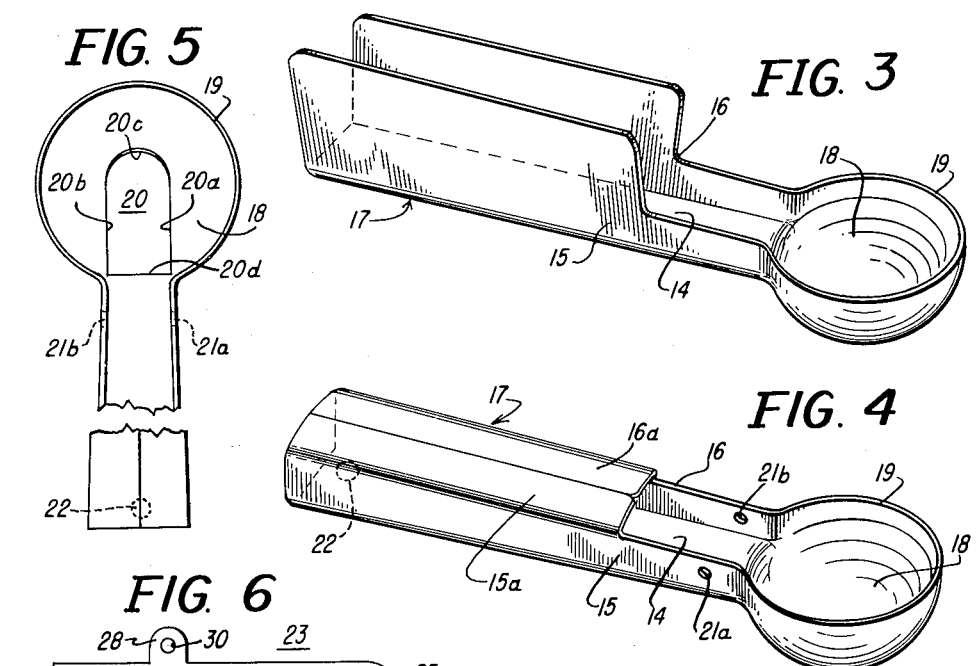
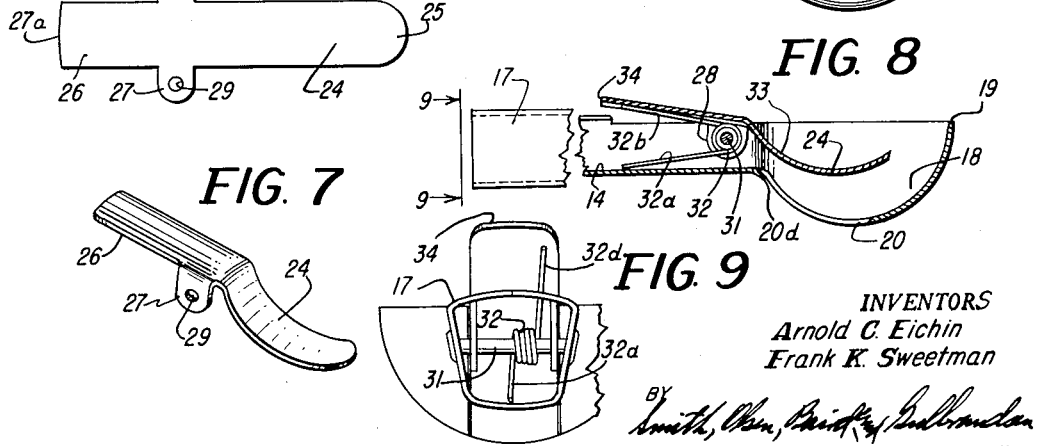
INVENTORS
Arnold C. Eichin
Frank K. Sweetman
Attys.

United States Patent Office 2,756,698
Patented July 31, 1956

2,756,698

SCOOP FOR ICE CREAM AND THE LIKE

Arnold C. Eichin and Frank K. Sweetman, Chicago, Ill.

Application February 24, 1954, Serial No. 412,156

1 Claim. (Cl. 107—48)

The present invention relates in general to improvements in dippers or scoops for ice cream and the like, and in particular to such devices which are arranged so that they may be used in serving a measured amount of ice cream and the like.

It is the principal object of the present invention to provide a new and novel method of manufacturing a device of the type noted.

It is another object of the invention to provide a device of the type noted which is formed from flat sheet metal by stamping, drawing, and bending the same instead of employing the relatively slow, tedious and expensive procedure heretofore used in die casting such devices.

It is still another object of the invention to provide a device of the type noted, having a manually operable ejector forming a segment of the side and bottom portion of the bowl of the scoop and which is easily actuated by the thumb of the user to eject a ball of ice cream and the like from the bowl.

It is still another object of the invention to provide a device of the type noted which is light weight, corrosion resistant and includes a minimum number of parts which can be economically manufactured and assembled.

It is a further object of the invention to provide a device of the type noted which is manufactured of such materials and arranged in such a manner that the normal heat from the hand of the user will be quickly conducted from the handle to the scoop portion of the device and thereby enable the user to serve and eject ice cream from the bowl of the scoop a number of times before it is necessary to again heat the bowl by placing it in hot or luke warm water, a step that is necessary after each serving with known ice cream dippers.

These and further objects and advantages of the present invention will best be understood from the following description thereof, taken in connection with the accompanying drawing in which:

Figure 1 is a perspective view of the improved device;

Fig. 2 shows the shape of the flat metal blank, in reduced scale, from which the handle and bowl portions of the device are integrally formed;

Fig. 3 is a perspective view of the handle and bowl portions of the device after the first forming operation has been performed on the blank of Fig. 2 and shows the first step in forming the handle and the bowl;

Fig. 4 is a perspective view of the handle and bowl portions of the device after the second forming operation has been performed on the blank of Fig. 2 and shows a second step in forming of the handle portion of the device;

Fig. 5 is a plan view of the handle and bowl portions of the device after the third forming operation is performed and shows the shape of the cut-out formed in the bottom and wall portions of the bowl;

Fig. 6 shows the shape of the flat metal blank from which the ejector for the device is formed;

Fig. 7 is a perspective view of the ejector after the first forming operation has been performed on the blank of Fig. 6;

Fig. 8 shows a sectional view taken along line 8—8 of Fig. 1, but showing the ejector in a partially actuated position; and Fig. 9 is an end view, taken along line 9—9 of Fig. 8.

Referring now to Fig. 2, it will be seen that in the process of manufacturing the device of the present invention, a blank 10, having a substantially circular disk or spatula 11, a narrow neck-like portion 12 and an apron portion 13, is stamped from a flat sheet of metal, preferably aluminum of approximately one-sixteenth inch thickness. It should be understood that the blank 10 may be individually formed or a plurality of such blanks may be simultaneously formed, depending upon whether individual or multiple dies are employed in the stamping operation.

The next operation consists in placing the blank 10 into a forming and drawing die which is arranged to bend the apron portion 13 and the neck portion 12 of the blank 10 to form the bottom surface 14 and the side walls 15 and 16 for the handle 17 of the device, and to draw the metal forming the disk 11 of the blank 10 to provide a depending bowl 18 having its rim 19 swaged, and if necessary this edge may also be pinch trimmed, in order to provide a cutting edge for the bowl 18 portion of the device as is shown in Fig. 3.

The third step consists in bending the upper portions of the side walls 15 and 16 inwardly toward each other in alignment with the rim 19 to form the top surfaces 15a and 16a of the handle 17, as is shown in Fig. 4. During this step, the top of the handle 17 may be given a sharp blow to set the material forming the hollow handle 17 and, if desired, any written matter, such as a manufacturer's name, trademark or any other information may be swaged into the top surface of the handle 17.

The next or fourth step in the formation of the handle and bowl portions of the device consists in perforating a slot 20, having parallel sides 20a and 20b and a semi-circular edge 20c, substantially concentric with the center of the bowl, and having a substantially straight edge 20d adjacent the juncture of the bottom surface 14 of the handle 17 and the bowl 18. The slot 20 forms the opening into which a portion of the ejector is fitted for the pivoted movement for the purpose of ejecting the contents in the bowl whenever desired.

Although the next or fifth step in formation of the handle and bowl portions of the device will be described as a separate step, it should be understood that this operation may be performed simultaneously with either the third or the fourth steps. This step consists in perforating or drilling the two mounting holes 21a and 21b in the respective sides 15 and 16 of the handle 17 portion of the device. These holes are provided for the purpose of receiving the hinge pin or rivet for pivotally mounting the ejector as will be described hereinafter. Also during this step the hole 22 may be perforated or drilled in the bottom surface of the handle 17 to provide a means to permit the device to be supported by a hook or the like.

All of the operations or steps necessary for the fabrication of the handle 17 and bowl 18 portions of the device are now completed. The manner in which the ejector is fabricated will now be described.

Referring now to Figs. 6 and 7, it will be seen that in the process of manufacturing the ejector of the device of the present invention, a blank 23, having a first tongue 24 terminating in a semi-circular edge 25, a second tongue 26 terminating in a slightly curved edge 27a and two oppositely disposed transverse tabs 27 and 28 having holes 29 and 30 respectively perforated therein, is stamped from a flat sheet of metal, preferably aluminum which may be of substantially the same thickness as the material for the handle and bowl. It should be understood that the blank 23 may be individually formed or a plurality of such blanks may be simultaneously formed, depending upon whether individual or multiple stamping dies are employed in the stamping operation.

The next operation consists in placing the blank 23 in a forming die which is arranged to bend the tongue 24 longitudinally and transversely to a convex contour substantially identical to the curvature to the bowl 18. Also, during this operation, the tongue 26 is concaved transversely along its entire length to provide smooth thumb engaging surface for the ejector. Finally, during this operation, the oppositely disposed tabs 27 and 28 are bent downwardly at right angles to the surface of the tongue 26 and parallel to each other, with the holes 29 and 30 in alignment with each other.

In addition to the above described two principal components comprising respectively the one-piece aluminum handle and bowl, as illustrated in Fig. 5, and the aluminum ejector, as illustrated in Fig. 7, the scoop of the present invention includes a rivet 31, preferably aluminum, and a stainless steel tension spring 32. All of the foregoing aluminum parts are anodized in order to provide maximum corrosion resistance and to substantially eliminate any possibility of contamination of any food products served by the device.

Referring now to Figs. 1, 8 and 9, it will be seen that the scoop shown therein may be assembled from the parts described above. In this connection it is noted that the bowl 18 is integrally formed with the handle 17 and that the slot or opening 20 in the bowl 18 extends from the bottom thereof upwardly, as best seen in Fig. 8, to the junction of the bowl and the bottom of the handle. The ejector 33, as shown in Fig. 7, is pivotally mounted by means of the rivet 31, which is threaded through the hole 21a in the side wall 15 of the handle 17, then through the hole 29 in the tab 27 of the ejector (Fig. 7), then through the coil of the spring 32 (Fig. 8), then through the hole 30 in the tab 28 of the ejector, and then through the hole 21b in the side wall 16 of the handle 17, and securely riveted in place. This rivet, in addition to providing the hinge for the ejector 33, also rigidly secures the walls 15 and 16 of the handle 17 and thereby materially increases the strength of the handle in the area adjacent the junction of the bowl and handle. Inasmuch as the spring 32 is provided with extended arms 32a and 32b, respectively engaging the bottom of the handle and the thumb engaging end 34 of the ejector 33, the ejector is normally tensioned to rotate in a clockwise direction as seen in Fig. 8. Thus the ejector is restrained in a position whereby the side edges and the semi-circular edge thereof, coincide with the slotted opening 20 to provide a bowl of substantially continuous inner surface. In this connection it should be noted that the edge 20d of the slot 20 in the bowl, acts as a stop to engage the bottom surface of the ejector 33 and thus prevents the ejector 33 fom further rotating in a clockwise direction beyond the bottom of the bowl 18.

When the device is used to dispense ice cream, or the like, the handle 17 is grasped by the user and the bowl 18 is then forced into the ice cream in such a manner that the cutting edge 19 forces the ice cream into the bowl. When the desired amount of ice cream is obtained, it may be dispensed or served by pressing the thumb engaging end 34 of the ejector 33 until the lower surface thereof engages the top surface of the handle 17. The opposite end of the ejector 33 is thus rotated in a counter-clockwise direction, as best seen in Fig. 8, and forces the ball of ice cream from the bowl 18. Due to the fact that the ejector engages a substantial portion of the ball of ice cream carried in the bowl 18, it is easily ejected from the bowl.

In prior ice cream scoops or dippers, it is generally necessary to place the bowl end of the scoop in luke warm water after each serving to prevent the ice cream from sticking to the bowl of the dipper, but it has been found that with the present device, the heat from the users hands is quickly carried to the bowl and thereby permits the user to consecutively serve a plurality of helpings of ice cream before it is necessary to place the bowl in luke warm water.

What is claimed is:

An ice cream scoop, comprising a sheet metal hemispherical bowl having a generally circular top edge, said bowl having a slot therein interrupting said top edge and extending therefrom to the bottom of said bowl, a hollow sheet metal handle formed integrally with said bowl and extending radially therefrom in alignment with said slot, said handle having a pair of opposite side walls joining with said bowl on opposite sides of said slot immediately below said top edge on said bowl, said handle having an integral bottom wall extending between said side walls, said bottom wall having a front edge extending across said slot and flush with the outer surface of said bowl at a point spaced downwardly from said top edge, said handle having a pair of inturned top flanges integral with the upper margins of said side walls, said flanges having opposed adjacent inner edges and thereby defining a top wall on said handle, said top wall being in substantially the same plane as said generally circular top edge of said bowl, said top flanges being cut away adjacent said bowl and thereby defining an opening in said top wall of said handle adjacent said bowl, said opening being in free communication at one end thereof with said slot, a sheet metal ejecting lever having a generally arcuate spherically curved arm corresponding in size and shape to said slot in said bowl and movable into a normal position occupying said slot and with opposite sides of said arcuate arm flush with the inner and outer surface of said bowl, said lever having a flat operating arm integral with said arcuate arm and movable into a normal position extending upwardly from said top edge of said bowl at an acute angle to the plane of said top flanges on said handle, said lever having a pair of downturned laterally spaced apertured pivot lugs integral with said operating arm, said lugs extending into said hollow handle between said side walls and through said opening in said top wall of said handle, a pivot extending through said lugs and said side walls adjacent said bowl, and a spring acting between said lever and said handle for biasing said lever into said normal position with said arcuate arm of said lever against said front edge of said bottom wall, said front edge thereby constituting a stop defining said normal position of said lever, said lever being manually swingable against the biasing action of said spring to move said arcuate arm of said lever into said bowl.

References Cited in the file of this patent

UNITED STATES PATENTS

| | | |
|---|---|---|
| 1,064,956 | Bernard | June 17, 1913 |
| 1,538,438 | Lawrence | May 19, 1925 |
| 1,769,218 | Garvis | July 1, 1930 |
| 2,239,046 | Lloyd | Apr. 22, 1941 |
| 2,669,194 | Brown | Feb. 16, 1954 |